(12) United States Patent
Mok et al.

(10) Patent No.: US 10,455,186 B2
(45) Date of Patent: Oct. 22, 2019

(54) METHOD AND APPARATUS FOR ALLOCATING RESOURCES

(71) Applicant: HANWHA TECHWIN CO., LTD., Seongnam-si (KR)

(72) Inventors: Seung Jun Mok, Changwon-si (KR); Ho Woong Lee, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 187 days.

(21) Appl. No.: 15/605,244

(22) Filed: May 25, 2017

(65) Prior Publication Data

US 2018/0054590 A1 Feb. 22, 2018

(30) Foreign Application Priority Data

Aug. 17, 2016 (KR) .................. 10-2016-0104494

(51) Int. Cl.
*H04N 5/77* (2006.01)
*H04N 21/4223* (2011.01)
*H04N 21/437* (2011.01)

(52) U.S. Cl.
CPC ........... *H04N 5/77* (2013.01); *H04N 21/4223* (2013.01); *H04N 21/437* (2013.01)

(58) Field of Classification Search
CPC .... H04N 5/77; H04N 21/437; H04N 21/4223; H04N 5/232
USPC .................. 386/223–224, 228, 285, 225
See application file for complete search history.

(56) References Cited

U.S. PATENT DOCUMENTS

| 7,236,690 | B2 * | 6/2007 | Matsukawa ...... G08B 13/19641 348/143 |
| 2007/0217765 | A1 | 9/2007 | Itoh et al. |
| 2008/0170566 | A1 * | 7/2008 | Akimoto ............. H04L 61/2015 370/389 |
| 2009/0160973 | A1 * | 6/2009 | Houda ...................... G06F 3/14 348/231.2 |
| 2009/0190653 | A1 * | 7/2009 | Seo ........................ H04N 5/765 375/240.01 |
| 2012/0300081 | A1 * | 11/2012 | Kim .................. G08B 13/19656 348/159 |
| 2013/0155250 | A1 * | 6/2013 | Myers .................... H04N 7/181 348/159 |

(Continued)

FOREIGN PATENT DOCUMENTS

EP 2 819 407 A1 12/2014
JP 4847165 B2 12/2011
(Continued)

*Primary Examiner* — Helen Shibru

(57) ABSTRACT

A method of allocating resources of a video recorder includes: setting a first channel from among a plurality of channels of the video recorder as a temporary registration channel; broadcasting a notification of temporary registration availability to one or more cameras from among a plurality of cameras; receiving a first temporary registration request in response to the notification of temporary registration availability from a first camera, from among the one or more cameras; allocating the first channel to the first camera in response to the first temporary registration request; and terminating the allocation of the first channel to the first camera, based on recording of video information of the first camera in the video recorder through the first channel.

18 Claims, 6 Drawing Sheets

(56) References Cited

U.S. PATENT DOCUMENTS

| | | | |
|---|---|---|---|
| 2014/0232874 A1* | 8/2014 | Meyer | H04N 7/181 348/159 |
| 2014/0300739 A1* | 10/2014 | Mimar | H04N 7/188 348/148 |
| 2015/0358575 A1 | 12/2015 | Park | |
| 2017/0178476 A1* | 6/2017 | Jeon | G08B 13/19656 |
| 2018/0176449 A1* | 6/2018 | Yoon | H04N 5/23206 |

FOREIGN PATENT DOCUMENTS

| | | |
|---|---|---|
| KR | 10-1366502 B1 | 3/2014 |
| KR | 10-1521534 B1 | 5/2015 |
| KR | 10-2015-0141095 A | 12/2015 |

\* cited by examiner

METHOD AND APPARATUS FOR ALLOCATING RESOURCES

CROSS-REFERENCE TO THE RELATED APPLICATION

This application claims priority from Korean Patent Application No. 10-2016-0104494, filed on Aug. 17, 2016, in the Korean Intellectual Property Office, the disclosure of which is incorporated herein in its entirety by reference.

BACKGROUND

1. Field

Methods and apparatuses consistent with one or more exemplary embodiments relate to allocating resources between electronic devices.

2. Description of the Related Art

Cameras may be installed inside or outside a building, and on streets for various purposes such as anti-crime, security, shop management, etc. The cameras may be connected to one another via a wired and/or wireless network to perform as network cameras.

In addition, a manager who manages a place where the camera is installed may access the camera via a personal computer and remotely manage a remote place such as a building, a shop, etc.

SUMMARY

One or more exemplary embodiments include resource allocation technology for allocating channels of a video recorder to cameras connected to one another via a network.

Additional aspects will be set forth in part in the description which follows and, in part, will be apparent from the description, or may be learned by practice of the exemplary embodiments.

According to an aspect of an exemplary embodiment, provided is a method of allocating resources of a video recorder by a resource allocation apparatus, the resource allocation apparatus including a communication interface and a processor, the method including: setting, by using the processor, a first channel from among a plurality of channels of the video recorder as a temporary registration channel; broadcasting, by using the communication interface, a notification of temporary registration availability to one or more cameras from among a plurality of cameras; receiving, by using the communication interface, a first temporary registration request in response to the notification of temporary registration availability from a first camera, from among the one or more cameras; allocating, by using the processor, the first channel to the first camera in response to the first temporary registration request; and terminating, by using the processor, the allocation of the first channel to the first camera, based on recording of video information of the first camera in the video recorder through the first channel.

The first temporary registration request may include information about at least one of an event sensed by the first camera and a capturing schedule of the first camera, and the allocation of the first channel to the first camera is terminated in response to determining that the event sensed by the first camera stops or a capture ending time according to the capturing schedule arrives.

The method may further include, after receiving the first temporary registration request from the first camera, receiving, by using the communication interface, a second temporary registration request in response to the notification of temporary registration availability from a second camera, from among the one or more cameras; after the allocation of the first channel to the first camera is terminated, allocating, by using the processor, the first channel to the second camera in response to the second temporary registration request; and terminating, by using the processor, the allocation of the first channel to the second camera, based on recording of video information of the second camera in the video recorder through the first channel.

The setting of the first channel as the temporary registration channel may include: allocating a stationary registration channel to at least one camera, other than the first camera among the plurality of cameras, to perform a continuous backup; and setting the first channel that is not allocated as the stationary registration channel from among the plurality of channels, as the temporary registration channel.

The setting of the first channel as the temporary registration channel may include allocating a stationary registration channel, that is not set as the temporary registration channel from among the plurality of channels, to at least one camera, other than the first camera among the one or more cameras, to perform a continuous backup.

The setting of the first channel as the temporary registration channel may include setting the first channel as the temporary registration channel in response to a user input to select the first channel as the temporary registration channel.

The method may further include, before the broadcasting of the notification of temporary registration availability, receiving a user input to select the one or more cameras from among the plurality of cameras, through the communication interface.

According to another aspect of an exemplary embodiment, provided is a resource allocation apparatus, including: a communication interface configured to broadcast a notification of temporary registration availability to one or more cameras from among a plurality of cameras, and configured to receive a first temporary registration request in response to the notification of temporary registration availability from a first camera from among the one or more cameras; and a processor configured to set a first channel from among a plurality of channels of a video recorder as a temporary registration channel, configured to allocate the first channel to the first camera in response to the first temporary registration request, and configured to terminate the allocation of the first channel to the first camera based on recording of video information of the first camera in the video recorder through the first channel.

The first temporary registration request may include information about at least one of an event sensed by the first camera and a capturing schedule of the first camera, and the processor may terminate the allocation of the first channel to the first camera in response to determining that the event sensed by the first camera stops or a capture ending time according to the capturing schedule arrives.

After receiving the first temporary registration request from the first camera, the communication interface may receive a second temporary registration request in response to the notification of temporary registration availability from a second camera, from among the one or more cameras, and wherein the processor, after terminating the allocation of the first channel to the first camera, may allocate the first channel to the second camera in response to the second temporary registration request, and terminate the allocation of the first channel to the second camera based on recording of video information of the second camera in the video recorder through the first channel.

The processor may allocate a stationary registration channel to at least one camera, other than the first camera among the plurality of cameras, to perform a continuous backup, and set the first channel that is not allocated as the stationary registration channel from among the plurality of channels as the temporary registration channel.

The communication interface may receive a user input to select the first channel as the temporary registration channel, and the processor may set the first channel as the temporary registration channel in response to the user input.

The communication interface may receive a user input to select the one or more cameras from among the plurality of cameras.

According to still another aspect of an exemplary embodiment, provided is a method of requesting allocation of resources of a video recorder to a movable camera, the movable camera including a communication interface and a processor, the method including: broadcasting, by the communication interface, a temporary registration request to a plurality of video recorders; receiving, by using the communication interface, a first notification of temporary registration availability in response to the temporary registration request from a first video recorder from among the plurality of video recorders; temporarily registering, by using the processor, the movable camera at a first channel of the first video recorder based on the first notification of temporary registration availability; and terminating, by using the processor, temporary registration at the first channel of the first video recorder based on backing up of video information of the movable camera in the first video recorder through the first channel.

The method may further include receiving a second notification of temporary registration availability in response to the temporary registration request from a second video recorder from among the plurality of video recorders, via the communication interface, and the temporary registering of the movable camera at the first channel of the first video recorder may include temporarily registering the movable camera at the first channel of the first video recorder according to an order of receiving the first notification of temporary registration availability and the second notification of temporary registration availability.

The broadcasting of the temporary registration request may be performed when an event is sensed by the movable camera or a capture starting time according to a capturing schedule of the movable camera arrives, and the terminating of the temporary registration at the first channel of the first video recorder may be performed when the event stops or a capture ending time according to the capturing schedule arrives.

The method may further include receiving a user input to select the movable camera from among a plurality of cameras, to perform the temporary registration.

The method may further include receiving a user input to designate the plurality of video recorders as candidates to which the temporary registration is to be performed.

The broadcasting of the temporary registration request may include: receiving a beacon from outside, via the communication interface; and broadcasting the temporary registration request to the plurality of video recorders in response to the beacon, via the communication interface.

The broadcasting of the temporary registration request may be performed when a current location of the camera sensed by a location sensor is within a predetermined area.

BRIEF DESCRIPTION OF THE DRAWINGS

The above and/or other aspects will be more apparent by describing certain exemplary embodiments with reference to the accompanying drawings in which.

DETAILED DESCRIPTION

Figure 1:
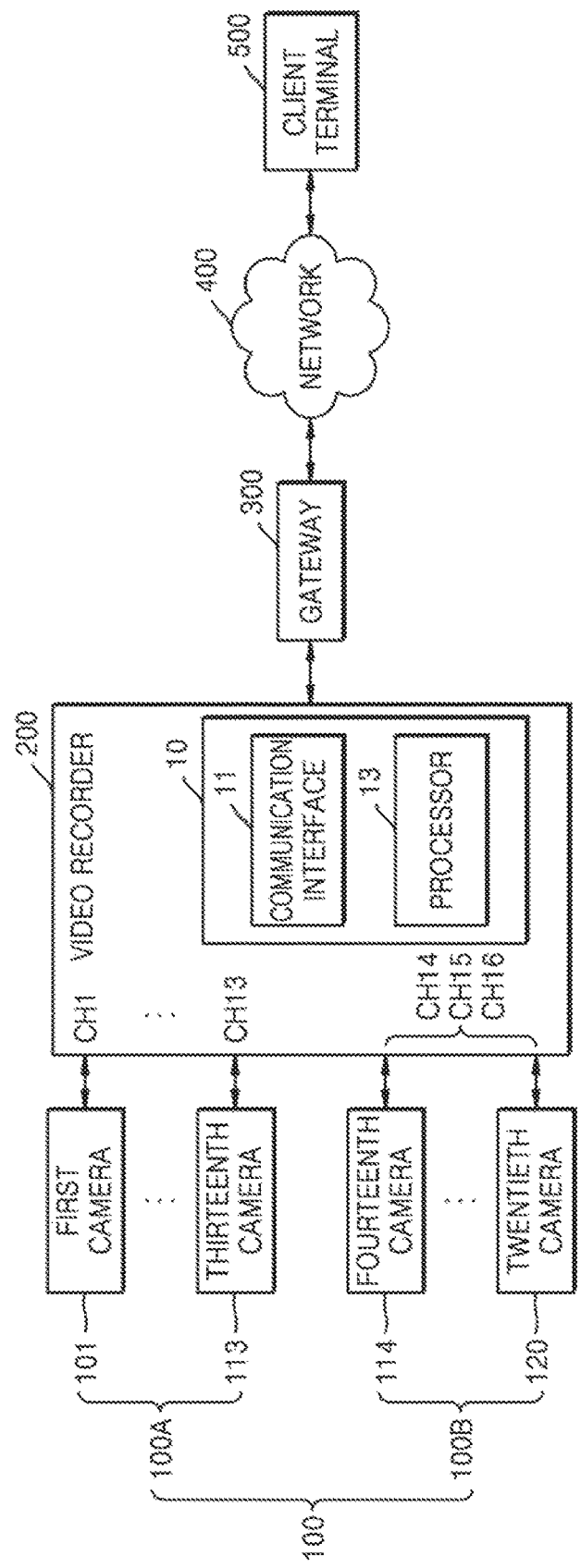
FIG. 1 is a diagram of a monitoring system according to an exemplary embodiment.

As the inventive concept allows for various changes and numerous exemplary embodiments, particular exemplary embodiments will be illustrated in the drawings and described in detail in the written description. However, this is not intended to limit the disclosure to particular modes of practice, and it is to be appreciated that all modifications, equivalents, and/or alternatives that do not depart from the spirit and technical scope of the disclosure are encompassed in the inventive concept. In the description, certain detailed explanations of the related art are omitted when it is deemed that they may unnecessarily obscure the essence of the disclosure.

It will be understood that although the terms "first," "second," etc. may be used herein to describe various components, these components should not be limited by these terms. Terms are only used to distinguish one element from other elements.

The terms used in the specification are merely used to describe particular exemplary embodiments, and are not intended to limit the disclosure. An expression used in the singular encompasses the expression of the plural, unless it has a clearly different meaning in the context. In the specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some exemplary embodiments of the disclosure may be represented as functional block structures and various processing stages. The functional blocks may be implemented as variety numbers hardware and/or software configurations executing certain functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the inventive concept may be implemented with any programming or scripting language such as C, C++, Java, assembler language, or the like, with the various algorithms being implemented with any combination of data structures, objects, processes, routines or other programming elements. The functional aspects may be implemented in algorithms that are executed on one or more processors. Also, the disclosure may employ any number of conventional techniques for electronics configuration, signal processing and/or control, data processing and the like. The words "mechanism," "element," "means," and "configuration" are used broadly and are not limited to mechanical or physical embodiments. The above terms may include software routines in conjunction with processors, etc.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more exemplary embodiments of the disclosure will be described in detail with reference to accompanying drawings.

FIG. 1 is a diagram of a monitoring system according to an exemplary embodiment.

Referring to FIG. 1, the monitoring system according to the exemplary embodiment includes a camera 100, a video recorder 200, a gateway 300, a network 400, and a client terminal 500.

The camera 100 captures (or photographs) a monitoring region to obtain a video of the monitoring region. The camera 100 may capture the monitoring region in real time for various purposes (e.g., for monitoring or security reasons).

One or more cameras 100 may be provided. For example, the monitoring system may include a first camera 101 to a twentieth camera 120.

The camera 100 may be a pan-tilt-zoom (PTZ) camera that is capable of panning and tilting and has a lens, a zoom magnification of which is adjustable.

The camera 100 may be a low-power camera driven by a battery. The low-power camera is usually in a sleep mode, and periodically wakes up to check whether an event occurs. The low-power camera switches to an active mode when an event occurs, and returns to the sleep mode when an event does not occur. As described above, the low-power camera enters to the active mode when an event occurs, and thus, power consumption may be reduced.

The camera 100 may operate in the sleep mode or the active mode according to a capturing schedule. For example, the camera 100 may operate in the sleep mode in a first time period and may operate in the active mode in a second time period that is different from the first time period, according to a setting of a user.

The camera 100 may be a movable camera. For example, the camera 100 may be a wearable camera that a user may wear.

The camera 100 may communicate with the video recorder 200 and/or the gateway 300 via various communication methods such as a wired and/or wireless location area network (LAN), Wi-Fi, ZigBee, Bluetooth, near field communication, etc. For example, the camera 100 may communicate with the video recorder 200 and/or the gateway 300 according to a low-power wireless communication protocol using radio frequency of an industrial scientific medical (ISM) band.

The camera 100 may include a camera 100A that needs continuous backup (e.g., the camera 100A has continuous backup) and a camera 100B that does not need continuous backup (e.g., the camera 100B does not have continuous backup). For example, first to thirteenth cameras 101 to 113 may be cameras 100A that need the continuous backup, and fourteenth to twentieth cameras 114 to 120 may be cameras 100B that do not need the continuous backup.

The cameras 100A that need the continuous backup and/or the cameras 100B that do not need the continuous backup may be determined (or classified) according to a user input.

The camera 100A that needs the continuous backup may be installed on a region where an event irregularly occurs or it is desirable to monitor a relatively long time, but is not limited thereto. The camera 100B that does not need the continuous backup may be installed on a region where an event normally occurs at a predetermined time or it is desirable to monitor at a certain time, but is not limited thereto.

The video recorder 200 records video information (e.g., a video) transmitted from the camera 100, and distributes recorded video information of the camera 100 to the client terminal 500 via the gateway 300 and the network 400.

The video recorder 200 may receive video information from a registered camera 100. The registered camera 100 may be the camera 100 to which a channel of the video recorder 200 is allocated.

There may be one or more channels including a stationary registration channel and/or a temporary registration channel. The stationary registration channel and/or the temporary registration channel may be determined (or classified) according to a user input.

For example, the video recorder 200 may set first to thirteenth channels CH1 to CH13 as the stationary registration channels according to the user input. The video recorder 200 may change the first to thirteenth channels CH1 to CH13 to the temporary registration channels according to the user input.

For example, the video recorder 200 may set fourteenth to sixteenth channels CH14 to CH16 as temporary registration channels according to the user input. The video recorder 200 may change the fourteenth to sixteenth channels CH14 to CH16 to the stationary registration channels according to the user input.

The number of stationary registration channels may be determined according to the number of cameras 100A that need the continuous backup.

The number of temporary registration channels may be determined according to the total number of channels and the number of stationary registration channels. The number of stationary registration channels may be determined according to the total number of channels and the number of temporary registration channels.

The number of stationary registration channels and/or the number of temporary registration channels may be determined according to the user input.

The stationary registration channels may be allocated to the cameras 100A that need the continuous backup, such as the first to thirteenth cameras 101 to 113. Here, the stationary registration channels may be allocated to the cameras 100A that need the continuous backup, without regard to the sensing of the event and/or capturing schedule.

The temporary registration channels may be allocated to the cameras 100B that do not need the continuous backup such as the fourteenth to twentieth cameras 114 to 120 or the allocation of the temporary registration channels may be terminated. Here, the temporary registration channels may be allocated to the cameras 100B that do not need the continuous backup or the allocation may be terminated according to the sensing of the event and/or the capturing schedule.

In addition, the video recorder 200 may allocate the stationary registration channels, e.g., the first to thirteenth channels CH1 to CH13, respectively to the first to thirteenth cameras 101 to 113, corresponding to the user input to select the first to thirteenth cameras 101 to 113 as the cameras 100A that need the continuous backup.

The video recorder 200 may allocate at least one of the temporary registration channels, e.g., at least one of the fourteenth to sixteenth channels CH14 to CH16, to at least one of the fourteenth to twentieth cameras 114 to 120, corresponding to the user input to select the fourteenth to twentieth cameras 114 to 120 as the cameras 100B that do not need the continuous backup.

The channels of the video recorder 200 may be allocated by a resource allocation apparatus 10. The resource allocation apparatus 10 may be built in the video recorder 200, or separately provided from the video recorder 200. For illustrative purposes, the resource allocation apparatus 10 built in the video recorder 200 will be described below with reference to FIGS. 1 to 4.

The resource allocation apparatus 10 includes a communication interface 11 and a processor 13.

The communication interface 11 broadcasts a notification of temporary registration availability, and receives a temporary registration request and video information.

The notification of temporary registration availability may be broadcasted to the cameras 100B that do not need the continuous backup, e.g., fourteenth to twentieth cameras 114 to 120. The notification of temporary registration availability may include identification information of the video recorder 200.

The temporary registration request may be transmitted from at least one of the cameras 100B that do not need the continuous backup, e.g., the fourteenth to twentieth cameras 114 to 120. The temporary registration request may correspond to the notification of temporary registration availability, and may include at least one of identification information, event information, and capturing schedule information of the cameras 100B that do not need the continuous backup.

The video information may include video data, video captured time, etc.

In addition, when the resource allocation apparatus 10 is provided separately from the video recorder 200, the video recorder 200 may receive the video information.

The processor 13 may set some of the plurality of channels of the video recorder 200 as the temporary registration channels, and set remaining channels of the plurality of channels as the stationary registration channels. For example, when the video recorder 200 provides 16 channels, the processor 13 may set first to thirteenth channels CH1 to CH13 as the stationary registration channels and set fourteenth to sixteenth channels CH14 to CH16 as the temporary registration channels.

The processor 13 may allocate the stationary registration channels to the cameras 100A that need the continuous backup. For example, the processor 13 may allocate the first to thirteenth channels CH1 to CH13 respectively to the first to thirteenth cameras 101 to 113.

The processor 13 may allocate the temporary registration channels to the cameras 100B that do not need the continuous backup. To this end, the processor 13 may broadcast a notification of temporary registration availability to the cameras 100B that do not need the continuous backup, and may allocate the temporary registration channels to the camera 100 that transmits a temporary registration request corresponding to the notification of temporary registration availability.

For example, when the camera 100 is not allocated to the fourteenth channel CH14, the processor 13 may broadcast the notification of temporary registration availability to the fourteenth to twentieth cameras 114 to 120. When the fourteenth camera 114 transmits a temporary registration request corresponding to the notification of temporary registration availability, the processor 13 may allocate the fourteenth channel CH14 to the fourteenth camera 114.

On the other hand, when temporary registration requests greater than the number of available temporary registration channels of the video recorder 200 are transmitted, the processor 13 may allocate the available temporary registration channels to the cameras 100B that do not need the continuous backup according to a priority order. The priority order may be determined according to, for example, a predetermined order among the fourteenth to twentieth cameras 114 to 120, an order of receiving the temporary registration requests through the communication interface 11, a predetermined order of events, a time when events occur, capturing schedule information, etc., but is not limited thereto.

For example, when the camera 100 is not allocated to the fourteenth channel CH14, the processor 13 may broadcast the notification of temporary registration availability to the fourteenth to twentieth cameras 114 to 120. When the fourteenth camera 114 transmits a temporary registration request corresponding to the notification of temporary registration availability and then the twentieth camera 120 transmits a temporary registration request corresponding to the notification of temporary registration availability, the processor 13 may firstly allocate the fourteenth channel CH14 to the fourteenth camera 114, and after the allocation of the fourteenth channel CH14 to the fourteenth camera 114 is terminated, the processor 13 may allocate the fourteenth channel CH14 to the twentieth camera 120.

The processor 13 may record video information of the cameras 100A that need the continuous backup in the video recorder 200, wherein the video information is transmitted through the stationary registration channel. Here, in a case where the recording of the video information of the camera 100A that needs the continuous backup is terminated, the processor 13 may maintain the allocation of the stationary registration channel to the camera 100A that needs the continuous backup.

For example, when the first camera 101 obtains video information corresponding to sensing of an event, the processor 13 receives the video information of the first camera 101 through the first channel CH1 and records the video information in the video recorder 200. In addition, even when the recording of the video information of the first camera 101 is terminated according to termination of the event, the processor 13 may maintain the allocation of the first channel CH1 to the first camera 101.

The processor 13 records video information of the camera 100B that does not need the continuous backup in the video recorder 200, wherein the video information is transmitted through the temporary registration channel, and when the recording of the video information of the camera 100B that does not need the continuous backup is finished, the processor 13 terminates the allocation of the temporary registration channel to the camera 100B that does not need the continuous backup.

For example, when the fourteenth camera 114 obtains video information according to the capturing schedule, the processor 13 receives the video information of the fourteenth camera 114 through the fourteenth channel CH14 and records the video information in the video recorder 200. In addition, when the recording of the video information of the fourteenth camera 114 is finished according to the capturing schedule, the processor 13 may terminate the allocation of the fourteenth channel CH14 to the fourteenth camera 114.

In addition, in a case where the resource allocation apparatus 10 is separately provided from the video recorder 200, the video recorder 200 may record the video information.

The gateway 300 receives the video information of the camera 100 from at least one video recorder 200, and may transmit the video information of the camera 100 to a server (not shown) through the network 400 or may receive a command from the server (not shown).

The network 400 may include a wired network and/or a wireless network. The wireless network may include a second-generation (2G) or third-generation (3G) cellular communication system, a 3rd generation partnership project (3GPP), a fourth-generation (4G) communication system, a long-term evolution (LTE), world interoperability for microwave access (WiMAX), etc.

The client terminal 500 may display or store information transmitted from the server (not shown). For example, the client terminal 500 may display on a screen the video information of the camera 100 transmitted from the server (not shown).

The client terminal 500 may include at least one processor. The client terminal 500 may be provided in a hardware device such as a microprocessor or a universal computer system and operate therein. The client terminal 500 may include a personal computer and a mobile terminal.

Figure 2:
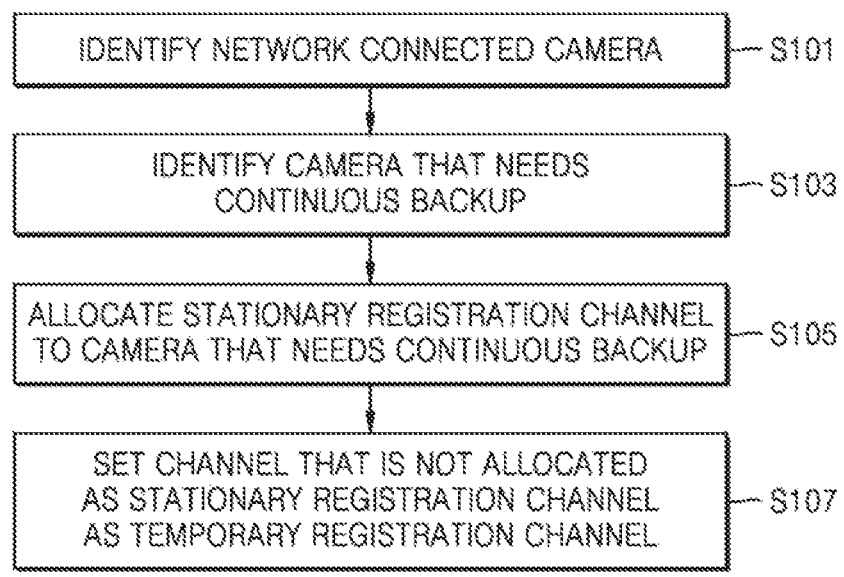
FIGS. 2 and 3 are flowcharts illustrating a method of setting a temporary registration channel according to exemplary embodiments.
Figure 3:
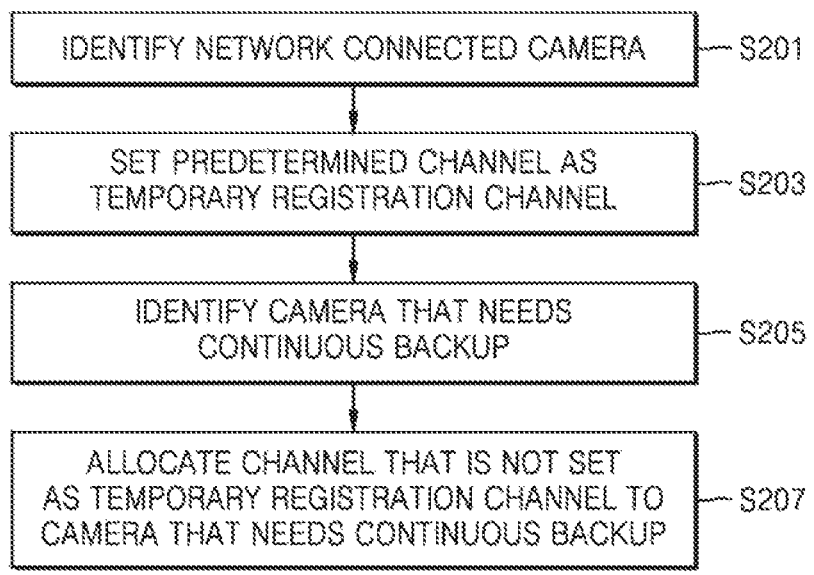

FIGS. 2 and 3 are flowcharts illustrating a method of setting a temporary registration channel according to exemplary embodiments.

Referring to FIG. 2, the resource allocation apparatus 10 according to the exemplary embodiment identifies the cameras 100 connected via a network (S101). Video information of the network-connected cameras 100 may be transmitted to one gateway 300. The resource allocation apparatus 10 may identify first to twentieth cameras 101 to 120 that transmit video information to the video recorder 200.

In addition, the resource allocation apparatus 10 may distinguish the camera 100A that needs the continuous backup from the network-connected cameras 100 (S103).

For example, the resource allocation apparatus 10 may identify the first to thirteenth cameras 101 to 113 as the cameras 100A that need the continuous backup.

Here, the resource allocation apparatus 10 may identify the first to thirteenth cameras 101 to 113 as the cameras 100A that need the continuous backup, in response to a user input.

In addition, the resource allocation apparatus 10 may identify the first to thirteenth cameras 101 to 113 as the cameras 100A that need the continuous backup, based on an installation region, an event occurrence time, a period of event occurrence, a frequency of occurring events, etc.

In addition, the resource allocation apparatus 10 allocates the stationary registration channels to the cameras 100A that need the continuous backup (S105). For example, the resource allocation apparatus 10 may set first to thirteenth channels CH1 to CH13 as the stationary registration channels from among sixteen channels of the video recorder 200, and may allocate the first to thirteenth channels CH1 to CH13 respectively to the first to thirteenth cameras 101 to 113.

Here, the resource allocation apparatus 10 may set the first to thirteenth channels CH1 to CH13 as the stationary registration channels in response to the user input, and may allocate the first to thirteenth channels CH1 to CH13 respectively to the first to thirteenth cameras 101 to 113.

In addition, the resource allocation apparatus 10 may set the fourteenth to sixteenth channels CH14 to CH16 as the temporary registration channels in response to the user input, and may allocate the first to thirteenth channels CH1 to CH13 respectively to the first to thirteenth cameras 101 to 113.

In addition, the resource allocation apparatus 10 may allocate the stationary registration channels, e.g., the first to thirteenth channels CH1 to CH13, respectively to the first to thirteenth cameras 101 to 113, corresponding to the user input to select the first to thirteenth cameras 101 to 113 as the cameras 100A that need the continuous backup.

Also, the resource allocation apparatus 10 may allocate the stationary registration channels, e.g., the first to thirteenth channels CH1 to CH13, respectively to the first to thirteenth cameras 101 to 113, corresponding to the user input to select the fourteenth to twentieth cameras 114 to 120 as the cameras 100B that do not need the continuous backup.

In addition, the resource allocation apparatus 10 may set the channels that are not allocated as the stationary registration channels, as the temporary registration channels (S107). For example, the resource allocation apparatus 10 may set the fourteenth to sixteenth channels CH14 to CH16 that are not set as the stationary registration channels from among the sixteen channels, as the temporary registration channels.

Referring to FIG. 3, the resource allocation apparatus 10 according to an exemplary embodiment identifies the network-connected cameras 100 (S201). For example, the resource allocation apparatus 10 may identify first to twentieth cameras 101 to 120 that transmit video information to the video recorder 200.

In addition, the resource allocation apparatus 10 sets a predetermined channel as the temporary registration channel (S203). For example, the resource allocation apparatus 10 may set the fourteenth to sixteenth channels CH14 to CH16 from among the sixteen channels, as the temporary registration channels.

For example, the resource allocation apparatus 10 may set the fourteenth to sixteenth channels CH14 to CH16 as the temporary registration channels in response to the user input.

In addition, the resource allocation apparatus 10 identifies the cameras 100A that need the continuous backup from among the network-connected cameras 100 (S205). For example, the resource allocation apparatus 10 may identify the first to thirteenth cameras 101 to 113 as the cameras 100A that need the continuous backup.

In addition, the resource allocation apparatus 10 allocates channels that are not set as the temporary registration channels to the cameras 100A that need the continuous backup (S207). For example, the resource allocation apparatus 10 may allocate the first to thirteenth channels CH1 to CH13 that are not set as the temporary registration channels from among the sixteen channels respectively to the cameras 100A that need the continuous backup, that is, the first to thirteenth cameras 101 to 113.

Here, the resource allocation apparatus 10 may allocate the first to thirteenth channels CH1 to CH13 respectively to the first to thirteenth cameras 101 to 113, in response to the user input to set the fourteenth to sixteenth channels CH14 to CH16 as the temporary registration channels.

Figure 4:
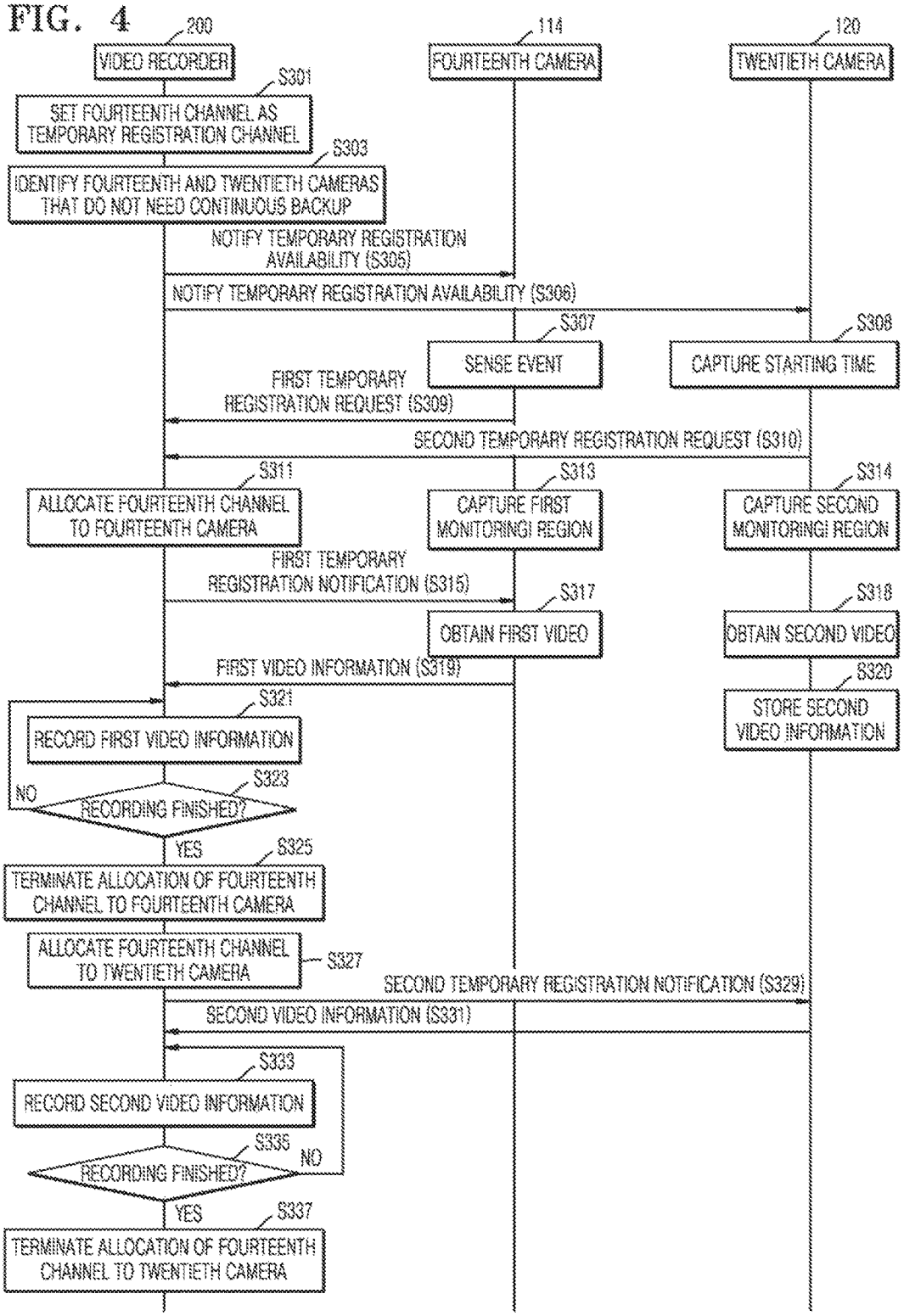
FIG. 4 is a flowchart illustrating a method of allocating resources according to an exemplary embodiment.

FIG. 4 is a flowchart illustrating a method of allocating resources according to an exemplary embodiment.

Referring to FIGS. 1 and 4, the video recorder 200 including the resource allocation apparatus 10 sets the fourteenth channels CH14 as the temporary registration channel, from among the sixteen channels of the video recorder 200 (S301). Here, the video recorder 200 may set the fourteenth channel CH14 as the temporary registration channel, according to the user input.

In addition, the video recorder 200 identifies the cameras 100B that do not need the continuous backup, that is, fourteenth and twentieth cameras 114 and 120, from among the first to twentieth cameras 101 to 120 (S303). Here, the video recorder 200 may identify the fourteenth and twentieth cameras 114 and 120 as the cameras 100B that do not need the continuous backup, according to the user input.

The video recorder 200 may broadcast a notification of temporary registration availability to the fourteenth to twentieth cameras 114 to 120, that is, the cameras 100B that do not need the continuous backup (S305 and S306).

When an event is sensed (S307), the fourteenth camera 114 may transmit a first temporary registration request corresponding to the notification of temporary registration availability to the video recorder 200 (S309). The first temporary registration request may include identification information of the fourteenth camera 114 and event information corresponding to the sensed event. The event information may include a kind of the event, a time of sensing the event, a notification of starting the capturing, etc., but is not limited thereto.

When the capturing starts according to a predetermined capturing schedule (S308), the twentieth camera 120 may transmit a second temporary registration request corresponding to the notification of temporary registration availability to the video recorder 200 (S310). The second temporary registration request may include identification information of the twentieth camera 120 and capturing schedule information. The capturing schedule information may include a capture starting time and a capture ending time, but is not limited thereto.

The video recorder 200 allocates the fourteenth channel CH14 to the fourteenth camera 114 that transmits the first temporary registration request (S311), and transmits a first temporary registration notification to the fourteenth camera 114 (S315).

When the video recorder 200 receives the first temporary registration request and the second temporary registration request corresponding to the notification of temporary registration availability, the video recorder 200 may allocate the fourteenth channel CH14 to the fourteenth camera 114 that transmits the first temporary registration request that is received by the video recorder 200 first. When the fourteenth channel CH14 is allocated to the fourteenth camera 114, the video recorder 200 may not allocate the fourteenth channel CH14 to the twentieth camera 120 until the allocation of the fourteenth channel CH14 to the fourteenth camera 114 is terminated.

The fourteenth camera 114 captures images from a first monitoring region in response to the sensing of the event (S313), and obtains a first video (S317).

In addition, in response to the first temporary registration notification, the fourteenth camera 114 transmits first video information to the video recorder 200 via the fourteenth channel CH14 (S319). The first video information may include identification information of the fourteenth camera 114, the first video obtained by the fourteenth camera 114, and the capturing time of the first video.

In addition, the video recorder 200 records the first video information (S321), and when the recording of the first video information is finished (S323), the video recorder 200 terminates allocation of the fourteenth channel CH14 to the fourteenth camera 114 (S325).

The video recorder 200 may stop recording of the first video information, based on the event information transmitted from the fourteenth camera 114. For example, the video recorder 200 may determine that the event according to the event information has ended in a case where receiving of the first video information is finished or in a case where a predetermined time period has passed from the receiving of the first temporary registration request or the receiving of the first video information, and the video recorder 200 may terminate the recording of the first video information.

In addition, the video recorder 200 allocates the fourteenth channel CH14 to the twentieth camera 120 that transmits the second temporary registration request (S327), and transmits a second temporary registration notification to the twentieth camera 120 (S329).

When the video recorder 200 receives the first temporary registration request and the second temporary registration request in response to the notification of temporary registration availability, the video recorder 200 may allocate the fourteenth channel CH14 to the twentieth camera 120, which has transmitted the second temporary registration request, after terminating the allocation of the fourteenth channel CH14 to the fourteenth camera 114.

The twentieth camera 120 captures images of a second monitoring region from the capture starting time (S314), and obtains a second video (S318). In addition, the twentieth camera 120 stores second video information (S320). Before receiving the second temporary registration notification corresponding to the second temporary registration request, the twentieth camera 120 may store the second video information in a memory built therein.

After receiving the second temporary registration notification corresponding to the second temporary registration request (S329), the twentieth camera 120 may transmit the second video information to the video recorder 200 via the fourteenth channel CH14 in response to the second temporary registration notification (S331). Here, the twentieth camera 120 may transmit to the video recorder 200 the second video information stored in the memory built therein.

In addition, the video recorder 200 records the second video information (S333), and when the recording of the second video information is finished (S335), the video recorder 200 terminates the allocation of the fourteenth channel CH14 to the twentieth camera 120 (S337).

The video recorder 200 may terminate the recording of the second video information based on the capturing schedule information transmitted from the twentieth camera 120. For example, the video recorder 200 may terminate the recording of the second video information at the capture ending time.

Figure 5:
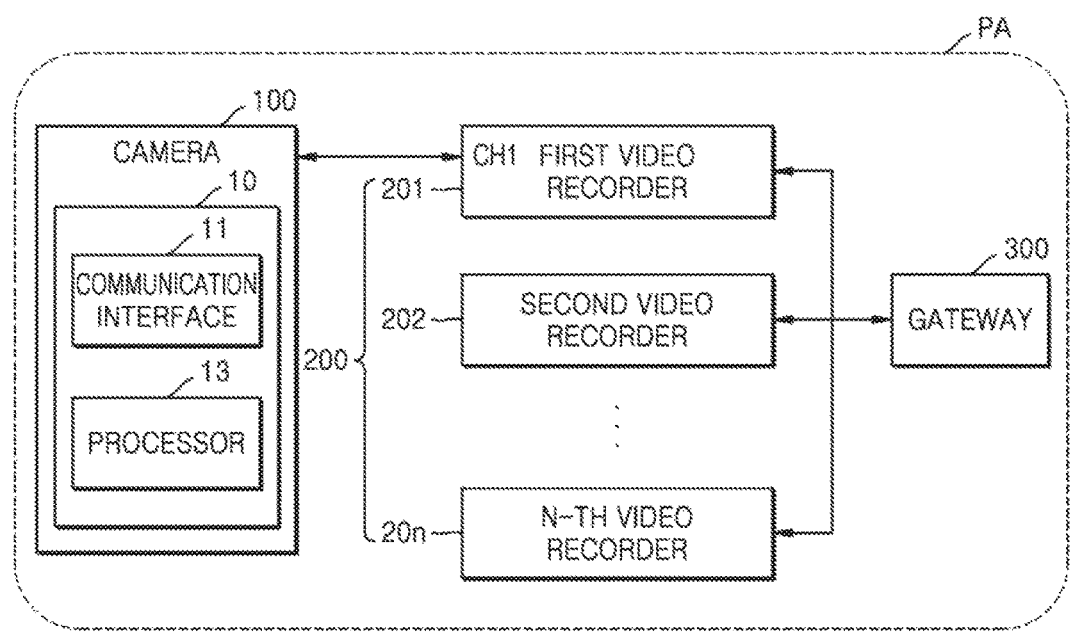
FIG. 5 is a diagram of a monitoring system according to another exemplary embodiment.

FIG. 5 is a diagram of a monitoring system according to another exemplary embodiment.

Referring to FIG. 5, the monitoring system according to another exemplary embodiment includes the camera 100, the video recorder 200, the gateway 300, the network 400, and the client terminal 500. Hereinafter, repetitive descriptions about elements will be omitted or briefly provided.

The camera 100 may be a wearable camera that is movable. The wearable camera may capture periphery of a user, and may generate video information including video information, sound information, location information, etc.

The wearable camera may store generated video information, and when a channel of the video recorder 200 is allocated thereto, the wearable camera may backup the video information in the video recorder 200.

The wearable camera may communicate with the video recorder 200 and/or the gateway 300 via various wireless communication methods such as Wi-Fi, ZigBee, Bluetooth, NFC, beacon, etc.

In addition, the wearable camera may be a camera that needs the continuous backup or a camera that does not need the continuous backup.

The wearable camera may be set as the camera that does not need the continuous backup according to the user input.

The wearable camera sensed in a predetermined area PA may be set as the camera that does not need the continuous backup.

The resource allocation apparatus 10 may be built in the camera 100, or may be separately provided from the camera 100. Hereinafter, for illustrative purposes, the resource allocation apparatus 10 built in the camera 100 will be described with reference to FIGS. 5 and 6.

The communication interface 11 may broadcast a temporary registration request, receive a notification of temporary registration availability, and transmit video information.

The temporary registration request may be broadcasted to at least one video recorder 200. The temporary registration request may include identification information of the camera 100, a capacity of the video information of the camera 100, etc.

When an event is sensed by a sensor of the camera 100 or a capture starting time according to the capturing schedule of the camera 100 arrives, the communication interface 11 may broadcast the temporary registration request to at least one video recorder 200.

When the communication interface 11 receives a beacon from outside, the communication interface 11 may broadcast the temporary registration request to the at least one video recorder 200 in response to the beacon.

For example, when a current location of the camera 100 sensed by a location sensor corresponds to the predetermined area PA, the communication interface 11 may broadcast the temporary registration request to the at least one video recorder 200.

The location sensor may be a global positioning system (GPS) sensor built in the camera 100, or may be separately provided from the camera 100.

The predetermined area PA may denote an area in which the camera 100 may communicate with the at least one video recorder 200. The predetermined area PA may be set by a user input.

The notification of temporary registration availability may be transmitted from the at least one video recorder 200. The notification of temporary registration availability may correspond to the temporary registration request, and may include identification information of the video recorder 200, a remaining capacity of the video recorder 200, etc.

The communication interface 11 may receive at least one of the user input to set the camera 100 as the camera 100B that does not need the continuous backup and a user input to designate at least one video recorder 200.

The processor 13 may register the camera 100 to a temporary registration channel of the video recorder 200. Here, the processor 13 may set a first video recorder 201 and an n-th video recorder 20n as the video recorder 200 corresponding to temporary registration, according to the user input.

When the video information of the camera 100 is backed-up in the video recorder 200 via the temporary registration channel, the processor 13 may terminate the temporary registration of the camera 100 at the temporary registration channel of the video recorder 200.

When the processor 13 receives at least one notification of temporary registration availability from the at least one video recorder 200 in response to a temporary registration request, the processor 13 may temporarily register the camera 100 at the temporary registration channel of the video recorder 200 having a higher priority. The priority order may be determined according to a predetermined order of the at least one video recorder 200, an order of receiving the notifications of temporary registration availability in the camera 100, etc., but is not limited thereto. For example, the processor 13 may temporarily register the camera 100 at the temporary registration channel of the video recorder 200 that transmits the notification of temporary registration availability that is received earlier.

When the event sensed by the sensor of the camera 100 is terminated or the capture ending time has come according to the capturing schedule, the processor 13 may terminate the temporary registration of the camera 100 at the temporary registration channel.

Figure 6:
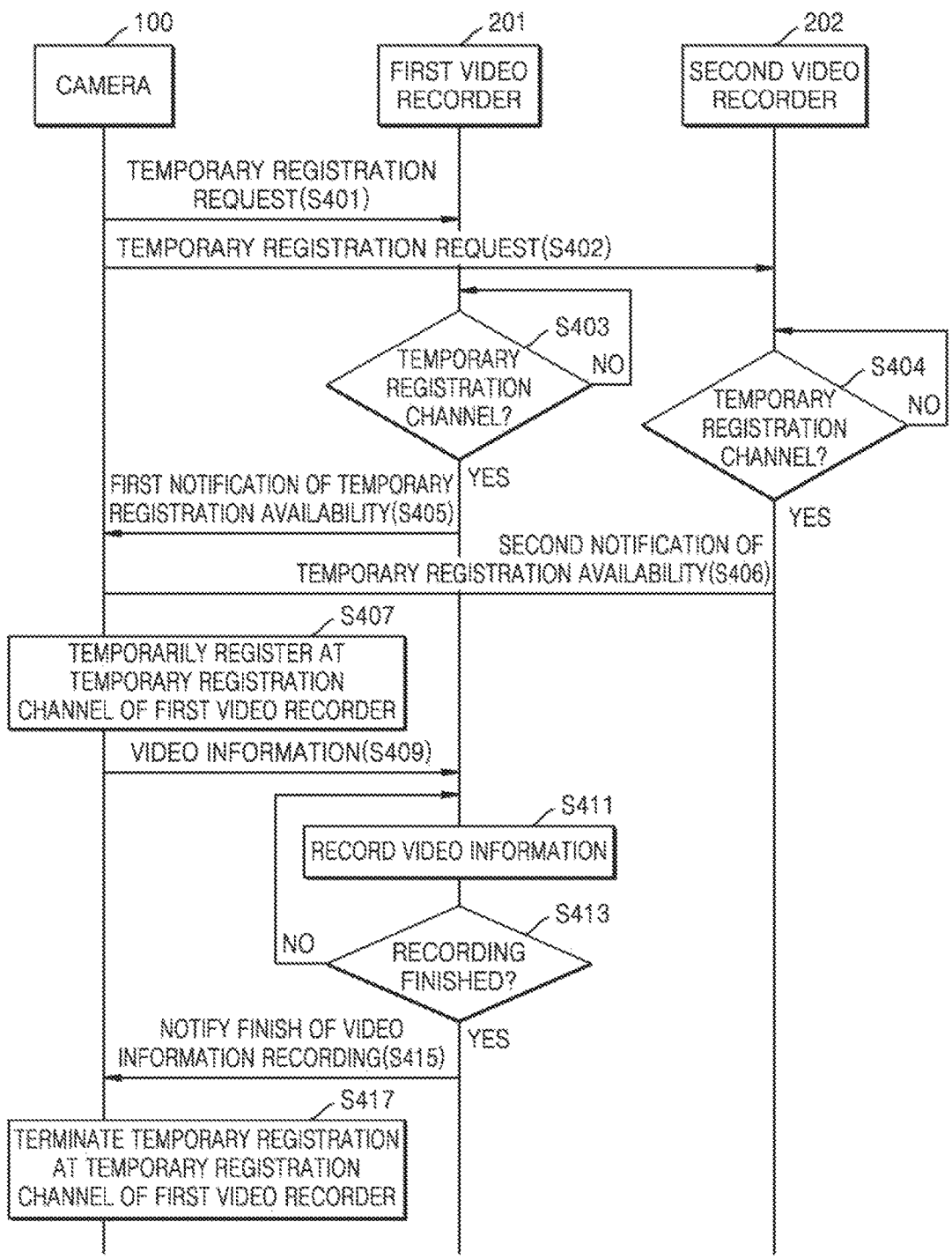
FIG. 6 is a flowchart illustrating a method of allocating resources according to another exemplary embodiment.

FIG. 6 is a flowchart illustrating a method of allocating resources according to another exemplary embodiment.

Referring to FIG. 6, the camera 100 including the resource allocation apparatus 10 broadcasts a temporary registration request to at least one video recorder 200, for example, a first video recorder 201 and a second video recorder 202 (S401 and S402).

The camera 100 may broadcast the temporary registration request to the first video recorder 201 and the second video recorder 202, in response to the user input to set the camera 100 as the camera 100B that does not need the continuous backup. When the camera 100 receives the user input to set the camera 100 as the camera 100A that needs the continuous backup, the camera 100 may stop broadcasting the temporary registration request to the first video recorder 201 and the second video recorder 202.

The camera 100 may broadcast the temporary registration request to the first video recorder 201 and the second video recorder 202, in response to the user input to designate the first video recorder 201 and the second video recorder 202 as the video recorders 200 corresponding to temporary registration. When the camera 100 receives a user input to designate the first video recorder 201 and the second video recorder 202 as the video recorders 200 corresponding to stationary registration, the camera 100 may stop broadcasting the temporary registration request to the first video recorder 201 and the second video recorder 202.

The camera 100 may broadcast the temporary registration request to the first video recorder 201 and the second video recorder 202, in response to a beacon transmitted from outside. For example, the first video recorder 201 and the second video recorder 202 may periodically transmit beacons. The camera 100 that has received the beacons from the first video recorder 201 and/or the second video recorder 202 may broadcast the temporary registration request to the first video recorder 201 and the second video recorder 202.

On the other hand, the camera 100 may periodically transmit beacons, and when the camera 100 receives beacons corresponding to those sent by the camera 100 from the first video recorder 201 and/or the second video recorder 202, the camera 100 may broadcast the temporary registration request to the first video recorder 201 and the second video recorder 202.

When the current location of the camera 100 sensed by the location sensor is within the predetermined area PA, the camera 100 may broadcast the temporary registration request to the first video recorder 201 and the second video recorder 202. The predetermined area PA may be determined according to the user input, or may denote an area including the first video recorder 201 and the second video recorder 202.

The camera 100 may broadcast the temporary registration request to the first video recorder 201 and the second video recorder 202 when an event is sensed or a capture starting time according to the capturing schedule has come. The event or the capturing schedule may be determined according to the user input.

When receiving the temporary registration request, the first video recorder 201 determines whether there is a temporary registration channel that is available (S403). When there is a temporary registration channel that is available, the first video recorder 201 may transmit a first notification of temporary registration availability to the camera 100 (S405).

In addition, when receiving the temporary registration request, the second video recorder 202 determines whether there is a temporary registration channel that is available (S404). When there is a temporary registration channel that is available, the second video recorder 202 may transmit a second notification of temporary registration availability to the camera 100 (S406).

When the camera 100 receives the first notification of temporary registration availability before the second notification of temporary registration availability, the camera 100 may temporarily register at the available temporary registration channel of the first video recorder 201 based on the first notification of temporary registration availability (S407).

In addition, the camera 100 backs up the video information in the first video recorder 201 via the temporary registration channel (S409). The first video recorder 201 records the video information of the camera 100, and when the recording of the video information of the camera 100 is finished (S413), the first video recorder 201 transmits a notification of termination of video information recording to the camera 100 (S415).

The camera 100 terminates the temporary registration to the temporary registration channel of the first video recorder 201 in response to the notification of termination of video information recording from the first video recorder 201 (S417).

When the event stops or the capture ending time according to the capturing schedule has come, the camera 100 may terminate the temporary registration to the temporary registration channel of the first video recorder 201.

When the current location of the camera 100 sensed by the location sensor is not included in the predetermined area PA, the camera 100 may terminate the temporary registration at the temporary registration channel of the first video recorder 201.

According to the exemplary embodiments of the disclosure, the monitoring system may record monitoring videos transmitted from the cameras, the number of which is greater than that of the channels in the video recorder.

In addition, according to the exemplary embodiments of the disclosure, the monitoring system may automatically allocate or terminate allocations of the channels of the video recorder to the cameras, which improves user's convenience.

It should be understood that exemplary embodiments described herein should be considered in a descriptive sense only and not for purposes of limitation. Descriptions of features or aspects within each embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method of allocating resources of a video recorder by a resource allocation apparatus, the resource allocation apparatus comprising a communication interface and a processor, the method comprising:
   setting, by using the processor, a first channel from among a plurality of channels of the video recorder as a temporary registration channel;
   broadcasting, by using the communication interface, a notification of temporary registration availability to one or more cameras from among a plurality of cameras;
   receiving, by using the communication interface, a first temporary registration request in response to the notification of temporary registration availability from a first camera, from among the one or more cameras, wherein the first temporary registration request comprises information about at least one of an event sensed by the first camera and a capturing schedule of the first camera;
   allocating, by using the processor, the first channel to the first camera in response to the first temporary registration request;
   terminating, by using the processor, the allocation of the first channel to the first camera, based on recording of video information of the first camera in the video recorder through the first channel;
   after receiving the first temporary registration request from the first camera, receiving, by using the communication interface, a second temporary registration request in response to the notification of temporary registration availability from a second camera, from among the one or more cameras, wherein the second temporary registration request comprises information about at least one of an event sensed by the second camera or a capturing schedule of the second camera;
   after the allocation of the first channel to the first camera is terminated, allocating, by using the processor, the first channel to the second camera in response to the second temporary registration request; and
   terminating, by using the processor, the allocation of the first channel to the second camera, based on recording of video information of the second camera in the video record through the first channel.

2. The method of claim 1, wherein the allocation of the first channel to the first camera is terminated in response to determining that the event sensed by the first camera stops or a capture ending time according to the capturing schedule arrives.

3. The method of claim 1, wherein the setting of the first channel as the temporary registration channel comprises:
   allocating a stationary registration channel to at least one camera, other than the first camera among the plurality of cameras, to perform a continuous backup; and
   setting the first channel that is not allocated as the stationary registration channel from among the plurality of channels, as the temporary registration channel.

4. The method of claim 1, wherein the setting of the first channel as the temporary registration channel comprises:
   allocating a stationary registration channel, that is not set as the temporary registration channel from among the plurality of channels, to at least one camera, other than the first camera among the one or more cameras, to perform a continuous backup.

5. The method of claim 1, wherein the setting of the first channel as the temporary registration channel comprises setting the first channel as the temporary registration channel in response to a user input to select the first channel as the temporary registration channel.

6. The method of claim 1, further comprising:
before the broadcasting of the notification of temporary registration availability, receiving a user input to select the one or more cameras from among the plurality of cameras, through the communication interface.

7. A resource allocation apparatus, comprising:
a communication interface configured to broadcast a notification of temporary registration availability to one or more cameras from among a plurality of cameras, and configured to receive a first temporary registration request in response to the notification of temporary registration availability from a first camera from among the one or more cameras; and
a processor configured to set a first channel from among a plurality of channels of a video recorder as a temporary registration channel, configured to allocate the first channel to the first camera in response to the first temporary registration request, and configured to terminate the allocation of the first channel to the first camera based on recording of video information of the first camera in the video recorder through the first channel,
wherein the first temporary registration request comprises information about at least one of an event sensed by the first camera and a capturing schedule of the first camera, and the processor is configured to terminate the allocation of the first channel to the first camera in response to determining that the event sensed by the first camera stops or a capture ending time according to the capturing schedule arrives.

8. The resource allocation apparatus of claim 7, wherein, after receiving the first temporary registration request from the first camera, the communication interface is configured to receive a second temporary registration request in response to the notification of temporary registration availability from a second camera, from among the one or more cameras, and
wherein the processor is configured to, after terminating the allocation of the first channel to the first camera, allocate the first channel to the second camera in response to the second temporary registration request, and configured to terminate the allocation of the first channel to the second camera based on recording of video information of the second camera in the video recorder through the first channel.

9. The resource allocation apparatus of claim 7, wherein the processor is configured to allocate a stationary registration channel to at least one camera, other than the first camera among the plurality of cameras, to perform a continuous backup, and configured to set the first channel that is not allocated as the stationary registration channel from among the plurality of channels as the temporary registration channel.

10. The resource allocation apparatus of claim 7, wherein the communication interface is configured to receive a user input to select the first channel as the temporary registration channel, and the processor is configured to set the first channel as the temporary registration channel in response to the user input.

11. The resource allocation apparatus of claim 7, wherein the communication interface is configured to receive a user input to select the one or more cameras from among the plurality of cameras.

12. A method of allocating resources of a video recorder by a resource allocation apparatus, the resource allocation apparatus comprising a communication interface and a processor, the method comprising:
setting, by using the processor, a first channel from among a plurality of channels of the video recorder as a temporary registration channel;
broadcasting, by using the communication interface, a notification of temporary registration availability to one or more cameras from among a plurality of cameras;
receiving, by using the communication interface, a first temporary registration request in response to the notification of temporary registration availability from a first camera, from among the one or more cameras, wherein the first temporary registration request comprises information about at least one of an event sensed by the first camera and a capturing schedule of the first camera;
allocating, by using the processor, the first channel to the first camera in response to the first temporary registration request; and
terminating, by using the processor, the allocation of the first channel to the first camera, based on recording of video information of the first camera in the video recorder through the first channel.

13. The method of claim 12, wherein the allocation of the first channel to the first camera is terminated in response to determining that the event sensed by the first camera stops or a capture ending time according to the capturing schedule of the first camera arrives.

14. The method of claim 12 further comprising:
after receiving the first temporary registration request from the first camera, receiving, by using the communication interface, a second temporary registration request in response to the notification of temporary registration availability from a second camera, from among the one or more cameras;
after the allocation of the first channel to the first camera is terminated, allocating, by using the processor, the first channel to the second camera in response to the second temporary registration request; and
terminating, by using the processor, the allocation of the first channel to the second camera, based on recording of video information of the second camera in the video recorder through the first channel.

15. The method of claim 12, wherein the setting of the first channel as the temporary registration channel comprises:
allocating a stationary registration channel to at least one camera, other than the first camera among the plurality of cameras, to perform a continuous backup; and
setting the first channel that is not allocated as the stationary registration channel from among the plurality of channels, as the temporary registration channel.

16. The method of claim 12, wherein the setting of the first channel as the temporary registration channel comprises:
allocating a stationary registration channel, that is not set as the temporary registration channel from among the plurality of channels, to at least one camera, other than the first camera among the one or more cameras, to perform a continuous backup.

17. The method of claim 12, wherein the setting of the first channel as the temporary registration channel comprises setting the first channel as the temporary registration channel in response to a user input to select the first channel as the temporary registration channel.

18. The method of claim 12, further comprising:
before the broadcasting of the notification of temporary registration availability, receiving a user input to select the one or more cameras from among the plurality of cameras, through the communication interface.

* * * * *